Aug. 25, 1964         A. J. COLAUTTI ETAL                3,145,988
                          VEHICLE CLOSURE
Filed Jan. 25, 1962                              3 Sheets-Sheet 1

INVENTORS
Albert J. Colautti &
BY  Barthold F. Meyer

Herbert Furman
ATTORNEY

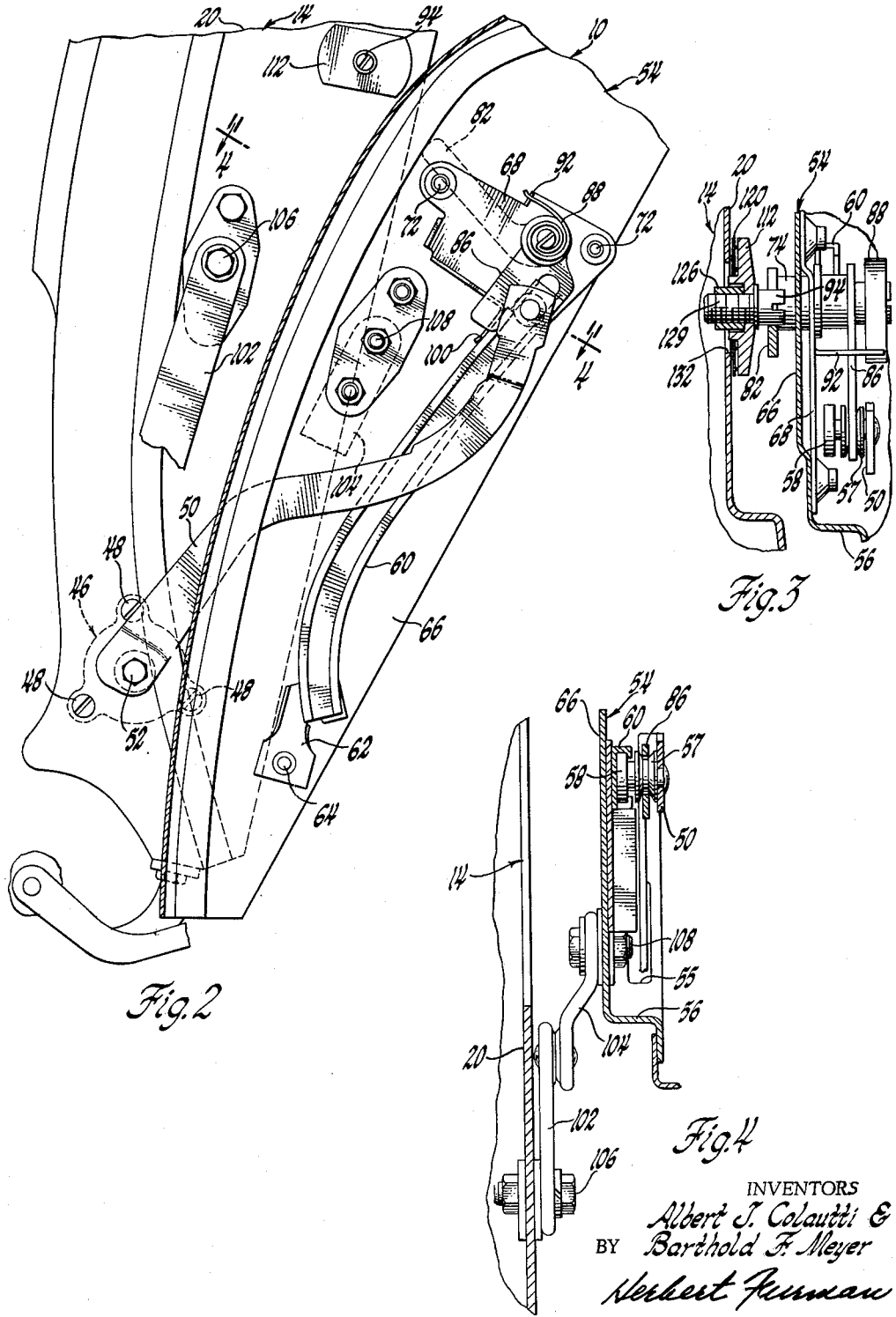

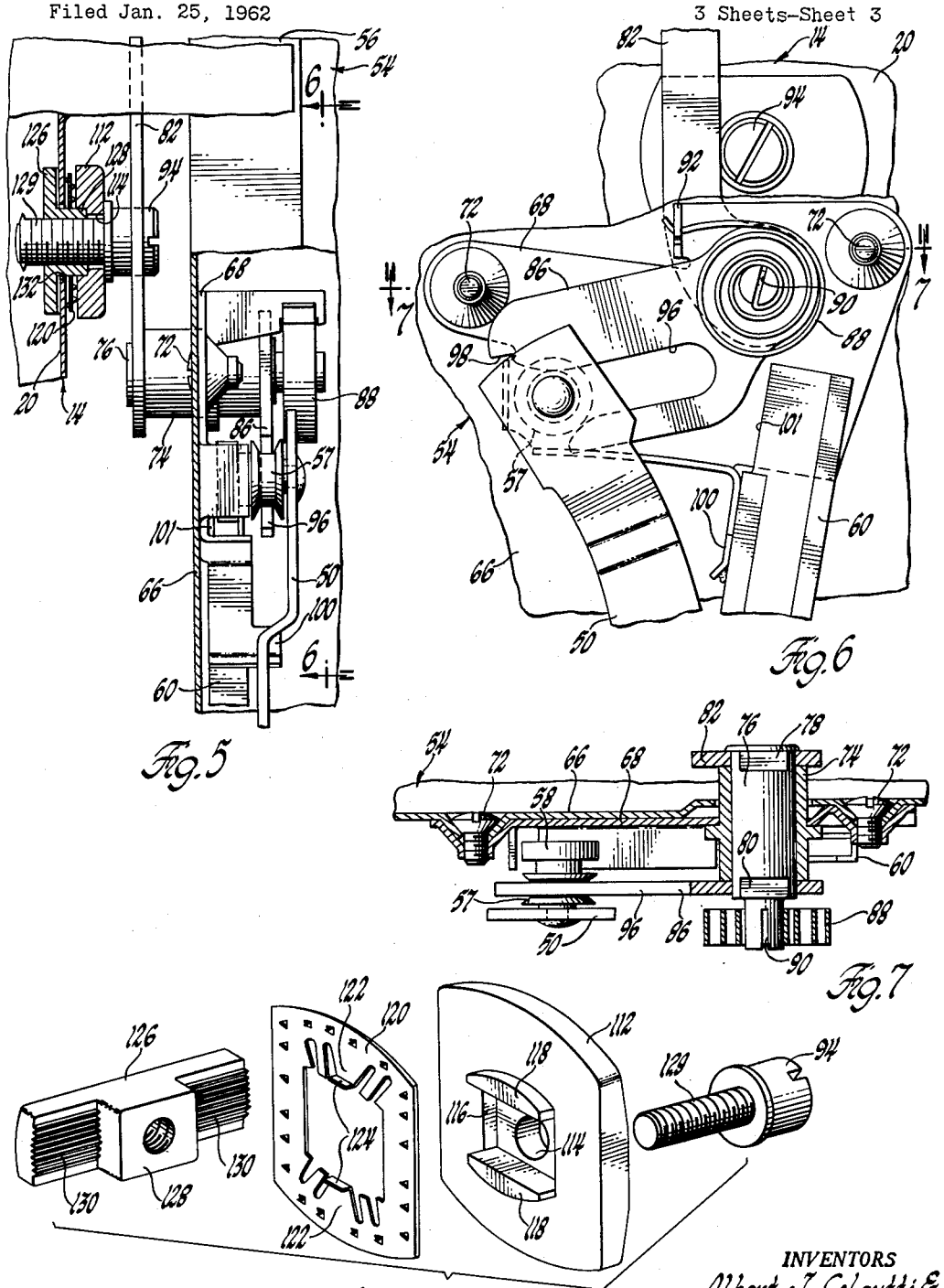

United States Patent Office 3,145,988
Patented Aug. 25, 1964

3,145,988
VEHICLE CLOSURE
Albert J. Colautti, Windsor, Ontario, and Barthold F. Meyer, Tecumseh, Ontario, Canada, assignors to General Motors Corporation, Detroit, Mich., a corporation of Delaware
Filed Jan. 25, 1962, Ser. No. 168,771
7 Claims. (Cl. 268—3)

This invention relates to vehicle closures and more particularly to power operated means for moving a vehicle closure member between open and closed positions and for latching and unlatching the closure member with respect to a body member.

Many station wagon type vehicle bodies include tail gate movable between open and closed positions and mounting a vertically movable tail gate window. It has been proposed to provide power operating means for moving the tail gate between open and closed positions and also for moving the tail gate window between open and closed positions. However, in such instances, the latching means has remained manually operable so that the operator must still leave his seat in order to release the tail gate latches to allow the power operated means to open the tail gate.

This invention provides a power operating means for moving the tail gate between its open and closed positions and also for latching and unlatching the tail gate with respect to the body. The operating means of this invention is of very simple construction but yet adequately performs its dual function. Thus, by operation of a single power actuating means, the operator can open and close the tail gate at will.

In the preferred embodiment of the invention, cam follower tracks are secured to the body pillars to each side of the tail gate and receive cam followers secured to lever arms which are pivoted to the body for swinging movement relative thereto and are connected to the power operating means. The latching means comprise latch bolts engageable with strikers, each including a latch operator which overlies or continues the upper end of a respective cam track. Movement of the lever arm cam followers within the tracks moves the tail gate between open and closed positions. When the lever arm cam followers have fully traversed the tracks, second cam followers secured to the lever arms engage the latch operators to swing the latch bolts between latched and unlatched positions so that sequential operation is provided.

The primary object of this invention is to provide an improved means for moving a vehicle closure member between open and closed positions with respect to a body member and for latching and unlatching the closure member with respect to the body member.

This and other objects of the invention will be readily apparent in the following specification and drawings, wherein:

FIGURE 2 is a view taken generally along the plane indicated by line 2—2 of FIGURE 1, but showing the tail gate in a partially open position;

FIGURE 3 is a sectional view taken generally along the plane indicated by line 3—3 of FIGURE 1;

FIGURE 4 is a sectional view taken generally along the plane indicated by line 4—4 of FIGURE 2;

FIGURE 5 is an enlarged view of a portion of FIGURE 1;

FIGURE 6 is a view taken along the plane indicated by line 6—6 of FIGURE 5;

FIGURE 7 is a sectional view taken generally along the plane indicated by line 7—7 of FIGURE 6, and;

FIGURE 8 is an exploded perspective view of the striker assembly.

Figure 1:
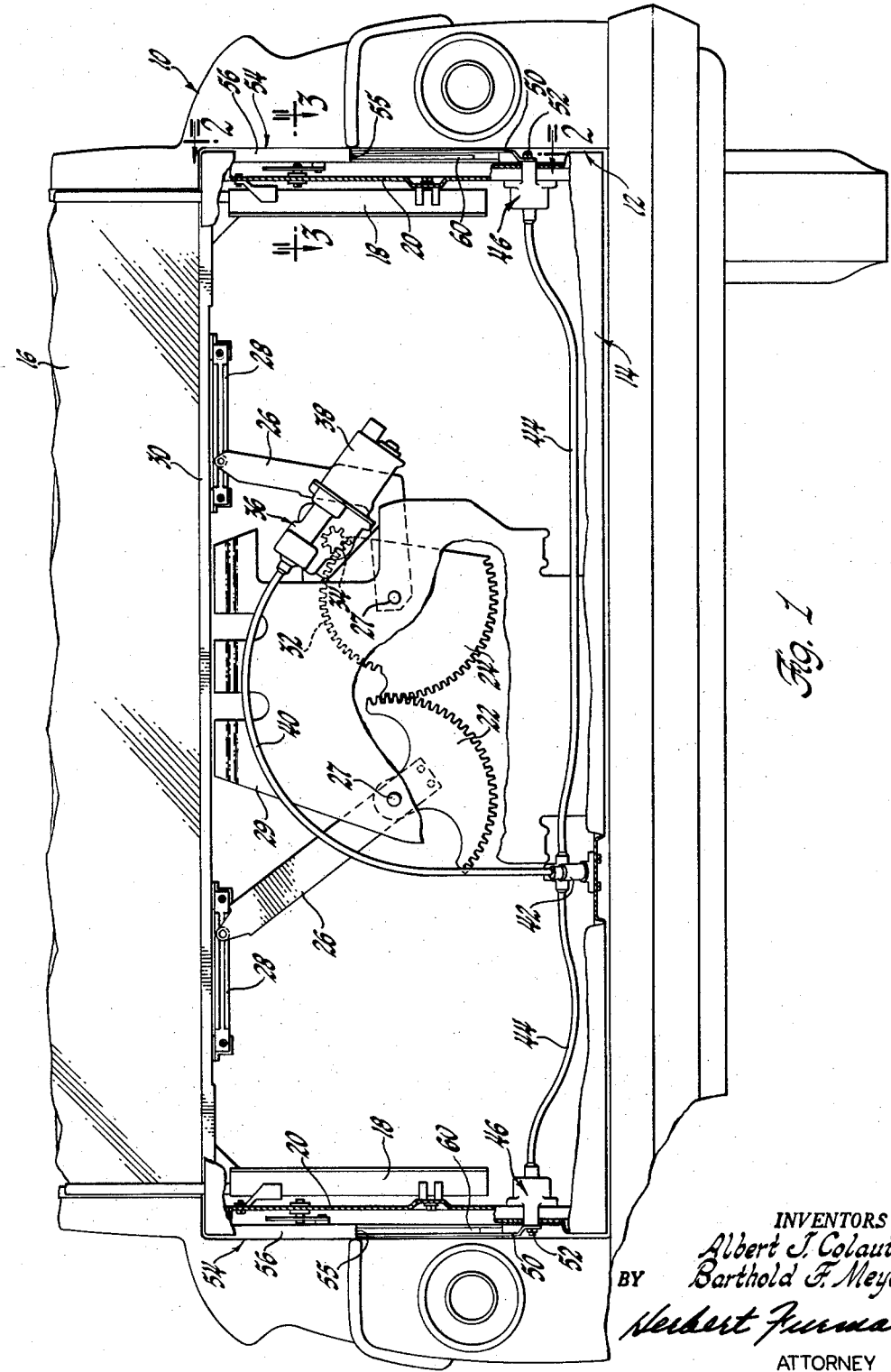
FIGURE 1 is a partially broken away partial rear elevational view of a station wagon type body having a tail gate and a tail gate window and embodying a tail gate operating means and latch operating means according to this invention.

Referring now particularly to FIGURE 1 of the drawings, a station wagon type of vehicle body 10 includes a rear opening 12, the lower portion of which is opened and closed by a tail gate 14 swingably mounted on body 10 by suitable hinge means, not shown, interconnecting the lower edge portion of the tail gate 14 and the body 10. The upper portion of opening 12 is opened and closed by a vertically movable tail gate window 16 which is mounted on tail gate 14 for movement between a closed position, as shown, and an open position, not shown, wherein the window 16 is received within the tail gate 14 and is guided for movement therein by suitable guides 18 secured in a suitable manner to the opposite side walls or jamb faces 20 of tail gate 14.

The window regulator mechanism for moving window 16 between its open and closed positions includes a pair of intermeshing sectors 22 and 24, each being secured to a window regulator lift arm 26, and being pivotally mounted at 27 on a support bracket 29 secured to the tail gate. Each arm 26 mounts a roller adjacent its free end slidably received in a cam channel 28 secured to the lower frame member 30 of the frame for window 16. Sector 24 includes a sector portion 32 which meshes with an output pinion 34 of a reduction gear unit 36. The unit 36 is driven by an electric motor 38 and includes therein, although not shown, conventional solenoid operated clutch means so that the unit 36 can drive either the pinion 34 or an output flexible cable 40. Cable 40 connects the unit 36 with a conventional transfer gear unit 42 secured to the lower wall of tail gate 14 and driving a pair of output cable assemblies 44 which connect the unit 42 with conventional reduction gear units 46 bolted at 48, FIGURE 2, to the side walls 20 of tail gate 14. The details of the gear units 36, 42 and 46, are neither shown nor described herein since they are of known construction and form no part of this invention.

Since the tail gate and latch operating means are the same on each side of the tail gate 14, only the right-hand means will be described, and it will be understood that the left-hand means is the same although of different hand.

Referring now to FIGURES 2 through 7 of the drawings, an arcuately shaped lever arm 50 is bolted at 52 adjacent the lower end thereof to the output shaft of the unit 46. Arm 50 projects within the body pillar 54 through a slot 55 provided in a wall portion 56 thereof. A cam follower assembly is pivotally secured to arm 50 adjacent the upper end thereof, and includes a generally pulley-shaped roller or cam follower 57 and a generally disc-shaped roller or cam follower 58 which is adapted to be received within an arcuately-shaped cam guide channel 60. Channel 60 is secured adjacent the lower end thereof to a bracket 62 bolted at 64 to the inner surface of the jamb face or side wall 66 of pillar 54. The upper end of channel 60 has the base thereof secured to a mounting bracket 68 which is secured to the inner surface of wall 66 by providing embossed tapped openings in the bracket which receive bolts 72, FIGURE 7. As best shown in FIGURE 7, a bushing 74 has the flange thereof secured to the mounting bracket 68 adjacent an opening therein and projects outwardly of the pillar wall 66 through an opening therein aligned with the bracket opening. A shaft 76 is rotatably received within the bushing 74 and includes opposite ends 78 and 80 of generally double D shape. A generally hook-shaped latch bolt or lever arm 82 includes an aperture therein of the shape of the outer end 78 of shaft 76 so as to be slidably and non-rotatably received on end 78. Bolt 82 is fixedly secured to the shaft against the outer end of bushing 74 by heading over the shaft. A forked latch operating lever 86 includes an aperature therein of the shape of the inner end 80 of shaft 76 so as to be slidably and non-rotatably received on end 80 in engagement with the inner end of bushing 74. Bolt 82 and lever 86 are disposed in a pre-arranged fixed angular relationship with respect to each other by suitably arranging the ends 78 and 80 of the shaft. A coil clock-type spring 88 has one end thereof received within a slot 90 provided on the inner end of shaft 76 and the other end thereof hooked within a notched lateral flange 92 of bracket 68. Spring 88 biases the lever 86 and bolt 82 in a counterclockwise direction at all times, as viewed in FIGURES 2 and 6.

When the tail gate is in a fully closed latched position, the latch bolt 82 engages a striker or stud 94 which is secured to the wall 20 of tail gate 14 in a manner to be hereinafter described.

Assuming now that the tail gate is in a fully closed latched position, that window 16 is in an open position, and that the operator desires to open the tail gate. Operation of the electric motor 38 in a suitable direction and operation of the clutch unit of drive unit 36 so as to drive the cable 40, and in turn, the cable 44, will cause the gear unit 46 to swing the arm 50 clockwise, as viewed in FIGURES 2 and 6, about the shaft 52 of the unit. As the arm 50 swings in a clockwise direction, FIGURE 6, the roller 57 secured to the upper end thereof and received within the slot 96 of lever 86 will move inwardly within this slot toward the closed end thereof and cooperate with spring 88 to swing lever 86 counterclockwise, and in turn, swing the latch bolt 82 in the same direction so that the bolt swings out of engagement with the stud 94 to release the tail gate from the body. As the lever 86 swings counterclockwise, the slot 96 thereof will come into general alignment with the opening of the guide channel 60 to move roller 58 within the channel 60. The outer side wall of channel 60 is cut away at 101, FIGURE 6, to permit roller 58 to enter and leave the channel 60 and the alignment of the slot 96 with the opening of the guide channel 60 is ensured by engagement of a shoulder 98 of the lever 86 with a lateral flange 100 of bracket 68. Thereafter, upon continued clockwise rotation of arm 50, roller 58 moves downwardly within channel 60 to move the tail gate outwardly of the body toward an open position. Once the roller 57 has moved out of the slot 96 of lever 86, spring 88 will hold the shoulder 98 in engagement with flange 100 to retain the bolt 82 in an unlatched position during opening movement of the tail gate. When the tail gate 14 is in a fully opened position, not shown, the roller 58 will be located adjacent the lower end of the channel 60.

In order to limit opening movement of the tail gate, a pair of pivotally interconnected links 102 and 104, FIGURES 2 and 4, have the respective other ends thereof pivotally secured at 106 and 108 to the tail gate wall 20 and to the pillar wall 66. Thus, it is impossible for the roller 58 to move out of the lower end of the channel 60.

It is believed that closing movement of the tail gate will be obvious from the foregoing description, since the arm 50 will be swung in an opposite or counterclockwise direction to move the roller 58 upwardly within the channel 60 and thereby move the tail gate toward closed position. Prior to the time that the roller 58 reaches the upper end of the channel 60, the roller 56 will have entered the slot 96 of lever arm 86. Once the roller 58 has moved past the upper end of the cut-away outer wall of channel 60, continued counterclockwise swinging movement of arm 50 will swing the lever 86 clockwise against the action of the spring 88 and swing the latch bolt 82 upwardly and into engagement with the stud 94 and thereby complete movement of the tail gate to a fully closed position by the camming action of the bolt 82 with the stud 94.

The details of the striker assembly are best shown in FIGURES 5 and 8. With reference to these figures, it will be noted that a striker plate 112 includes a central aperture 114 which freely receives the threaded shank of stud 94 therethrough. The rear face of plate 112 is provided with a generally rectangularly shaped groove 116 having oppositely disposed laterally extending lugs or flanges 118, the inner surfaces of which are generally parallel and form a continuation of the opposite walls of groove 116, and the outer surfaces of which are generally arcuately shaped. A spring steel shim plate 120 is provided with oppositely disposed lanced tangs or fingers, as shown in FIGURE 5, and is further provided with a central aperture, a portion of which is provided by oppositely extending flanges 122, each provided with a terminal lateral flange 124. Flanges 124 grippingly engage the outer surfaces of lugs 118 when the shim plate 120 is fitted onto the striker plate 112. An anchor bar 126 includes a central tapped block or lug portion 128 for threadingly receiving the shank 129 of stud 94. A plurality of adjacent ribs 130 are provided on bar 126 to each side of the lug portion 128.

The lug portion 128 of bar 126 is fitted within groove 116 and the shank 129 of stud 94 is then threaded into the threaded aperture of the lug portion so that the parts are loosely assembled. The wall 120 of the tail gate 14 is provided with an elongated generally horizontally extending aperture 132 having a length slightly greater than the length of bar 126 and a width slightly greater than the distance between the outer surfaces of lug 118. The anchor bar 126 is initially fitted within aperture 132 and then the striker plate 112 is located 90° so that the bar 126 extends crosswise of the aperture 132. Thereafter, the stud 94 is threaded into the threaded aperture of bar 126 to draw the ribs 130 of the bar into tight engagement with the inner surface of wall 20 and to draw the shim plate 120 into tight engagement with the outer surface of wall 20 and with striker plate 112 so that the teeth of this plate bite into the respective opposing surfaces to hold the striker assembly in place.

Thus, this invention provides a new and improved tail gate operating means and latch operating means.

What is claimed is:

1. In a vehicle body including a closure member movable between open and closed positions with respect to a body member, the combination comprising, latch means movable between latched and unlatched positions for latching said closure member to said body member, first cam means operatively connected to said latch means for moving said latch means between said positions, second cam means mounted on said body member, and cam follower means mounted on said closure member and successively engageable with said first and second cam means to successively move said latch means between latched and unlatched positions and move said closure member between open and closed positions.

2. In a vehicle body including a closure member movable between open and closed positions with respect to a body member, the combination comprising, latch means movable between latched and unlatched positions for latching said closure member to said body member, first cam means operatively connected to said latch means for moving said latch means between said positions, second cam means mounted on said body member, and cam follower means mounted on said closure member and successively engageable with and disengageable from said first cam means to move said latch means between latched and unlatched positions and successively engageable with and disengageable from said second cam means to move said closure member between open and closed positions.

3. In a vehicle body including a closure member movable between open and closed positions relative to a body member, the combination comprising, latch means mounted on one of said members for movement between latched and unlatched positions with respect to striker means mounted on the other of said members, first cam means operatively connected to said latch means for camming said latch means relative to said one member, second cam means mounted on said one member, and cam follower means mounted on said other member and engageable with said first cam means to cam said latch means relative to said one member between latched and unlatched positions and engageable with said second cam means to cam said members relative to each other and move said closure member between open and closed positions relative to said body member.

4. In a vehicle body including a closure member movable between open and closed positions relative to a body member, the combination comprising, latch means mounted on said body member for movement between latched and unlatched positions with respect to striker means mounted on said body member, first cam means operatively connected to said latch means for moving said latch means between said positions, second cam means mounted on said body member, and cam follower means mounted on said closure member and successively engageable with said first and second cam means to successively move said latch means between latched and unlatched positions and move said closure member between open and closed positions.

5. In a vehicle body including a closure member movable between open and closed positions with respect to a body member, the combination comprising, latch means mounted on said body member for movement between latched and unlatched positions, first cam means operatively connected to said latch means for moving said latch means between said positions, second cam means mounted on said body member, an arm swingably mounted on said closure member, and cam follower means mounted on said arm and successively engageable with said first and second cam means to successively move said latch means between latched and unlatched positions and move said closure member between open and closed positions.

6. In a vehicle body including a closure member movable between open and closed positions with respect to a body member, the combination comprising, latch means swingable between latched and unlatched positions for latching said closure member to said body member, first cam track means operatively connected to said latch means for moving said latch means between said positions, second cam track means fixedly mounted on said body member, an arm swingably mounted on said closure member, and cam follower means mounted on said arm and successively engageable with said first and second cam track means to successively swing said latch means between latched and unlatched positions and move said closure member between open and closed positions.

7. In a vehicle body including a closure member movable between open and closed positions with respect to a body member, the combination comprising, a latch bolt swingably mounted on said body member for movement between latched and unlatched positions with respect to striker means mounted on said closure member, a latch operating lever secured to said bolt for movement therewith and including a cam slot therein, a cam track secured to said body member, said latch operating lever having the slot therein positioned over said track in the unlatched position of said bolt, and cam follower means mounted on said closure member, said cam follower means being successively engageable with said cam track to move said closure member between open and closed positions and with said cam slot of said latch operating lever to swing said lever and thereby move said bolt between unlatched and latched positions.

References Cited in the file of this patent
UNITED STATES PATENTS 2,038,901    Mollet ------------------ Apr. 28, 1936
2,901,244    Jones ------------------ Aug. 25, 1959